US008760671B2

(12) United States Patent
Yamada

(10) Patent No.: US 8,760,671 B2
(45) Date of Patent: Jun. 24, 2014

(54) IMAGE FORMING APPARATUS

(75) Inventor: Akihiro Yamada, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1246 days.

(21) Appl. No.: 11/902,686

(22) Filed: Sep. 25, 2007

(65) Prior Publication Data

US 2008/0079999 A1 Apr. 3, 2008

(30) Foreign Application Priority Data

Sep. 28, 2006 (JP) .................................. 2006-264695

(51) Int. Cl.
*G06F 3/12* (2006.01)
*G06K 15/00* (2006.01)

(52) U.S. Cl.
USPC ...... 358/1.13; 358/1.15; 358/1.16; 348/207.2

(58) Field of Classification Search
USPC ..................... 358/1.13, 1.15, 1.16; 348/207.2
See application file for complete search history.

(56) References Cited

U.S. PATENT DOCUMENTS

| 5,768,583 | A | * | 6/1998 | Orzol et al. ........................ 713/1 |
| 7,170,627 | B2 | | 1/2007 | Tanaka et al. |
| 7,173,730 | B1 | * | 2/2007 | Suzuki et al. ................. 358/1.16 |
| 2003/0081235 | A1 | | 5/2003 | Tanaka et al. |
| 2005/0045711 | A1 | * | 3/2005 | Satake ............................ 235/375 |
| 2005/0162695 | A1 | * | 7/2005 | Shiraiwa ....................... 358/1.16 |
| 2005/0243362 | A1 | * | 11/2005 | Sakuda et al. ................. 358/1.15 |
| 2005/0270579 | A1 | * | 12/2005 | Hibi et al. ..................... 358/1.16 |
| 2006/0018223 | A1 | * | 1/2006 | Ji et al. ......................... 369/47.12 |
| 2006/0061823 | A1 | * | 3/2006 | Riesel et al. .................. 358/1.16 |
| 2006/0119893 | A1 | * | 6/2006 | Tanaka et al. ................. 358/1.15 |
| 2006/0176497 | A1 | | 8/2006 | Kimura et al. |

FOREIGN PATENT DOCUMENTS

| JP | 2001-111928 | | 4/2001 |
| JP | 2003-143539 | A | 5/2003 |
| JP | 2004-188772 | A | 7/2004 |
| JP | 2005-222233 | A | 8/2005 |
| JP | 2005-309879 | | 11/2005 |
| JP | 2005-349822 | | 12/2005 |
| JP | 2006-167973 | | 6/2006 |
| JP | 2006-218845 | | 8/2006 |
| JP | 2006-245687 | | 9/2006 |

OTHER PUBLICATIONS

Japanese Notice of Reasons for Refusal, w/ English translation thereof, issued in Japanese Patent Application No. JP 2006-264695 dated Jan. 6, 2009.
Japanese Notice of Reasons for Refusal, w/ English translation thereof, issued in Japanese Patent Application No. JP 2006-264695 dated on Oct. 7, 2008.

* cited by examiner

*Primary Examiner* — King Poon
*Assistant Examiner* — Vincent Peren
(74) *Attorney, Agent, or Firm* — Miles & Stockbridge P.C.

(57) ABSTRACT

One aspect of the present invention can include an image forming apparatus including an external storage medium, a judging part configured to determine whether or not the storage medium contains non-printed file, an extracting part configured to extract the non-printed file as a print target from the storage medium if the judging part determines that the non-printed file is present, and a printing part configured to execute print processing on the non-printed file extracted by the extracting part.

19 Claims, 14 Drawing Sheets

FIG.8A

| LIST OF ALL FILES | | |
|---|---|---|
| yamada00001.JPG | 2006/07/06 11:00 | 0 |
| yamada00002.JPG | 2006/07/06 11:00 | 1 |
| FILE00003.JPG | 2006/07/10 9:45 | 1 |
| FILE00005.JPG | 2006/07/10 10:01 | 0 |
| yoshida00001.TIFF | 2006/07/19 16:48 | 0 |
| FILE00002.TIFF | 2006/07/20 18:33 | 0 |
| FILE00001.PDF | 2006/07/20 18:44 | 0 |
| FILE00002.PDF | 2006/07/20 18:44 | 0 |
| FILE00003.PDF | 2006/07/20 19:10 | 0 |
| FILE00001.PRN | 2006/08/17 10:27 | 0 |
| FILE00002.PRN | 2006/08/17 10:54 | 0 |

FIG.8B yamada00001.JPG
yoshida00001.TIFF

FIG.8C yoshida00001.TIFF
FILE00002.TIFF

FIG.8D yoshida00001.TIFF

FIG.8E

```
yamada00001.JPG
FILE00003.JPG
FILE00005.JPG
```

IMAGE FORMING APPARATUS

CROSS REFERENCE TO RELATED APPLICATION

This application claims priority from Japanese Patent Application No. 2006-264695 filed Sep. 28, 2006. The entire content of this priority application is incorporated herein by reference.

TECHNICAL FIELD

This disclosure relates to an image forming apparatus having a direct print function to directly capture files from an external storage medium and print the files.

BACKGROUND

As an example of an image forming apparatus having a direct print function, a technique is known for inputting a range of date into the image forming apparatus and to extract only image file within the range of date as a print candidate in order to narrow down image file stored in a memory card (equipped in the body of the image forming apparatus) by date.

However, according to the above conventional technique, if the image file extracted as a print candidate includes a file that has been already printed, i.e., that need not be printed, then only non-printed files in the above print candidate must be further designated, thereby taking extra efforts.

Additionally, desired file cannot be extracted efficiently only by designating the range of date.

SUMMARY

One aspect of the present invention can include an image forming apparatus including an external storage medium, a judging part configured to determine whether or not the storage medium contains non-printed file(data), an extracting part configured to extract the non-printed file as a print target from the storage medium if the judging part determines that the non-printed file is present, and a printing part configured to execute print processing on the non-printed file extracted by the extracting part.

According to this configuration, only a non-printed file stored in an external storage medium can be subjected to the direct print efficiently.

Other aspect of the present invention is directed to an image forming apparatus being accessible to an external storage medium, that includes a setting part configured to set at least one of letters and symbols that can be used in a file name of a file stored in said storage medium as an extraction condition, an extracting part configured to extract a file including at least one of the letters and symbols set by the setting part in the file name as a print target from the storage medium, and a printing part configured to execute print processing on the file extracted by said extracting part.

According to this configuration, only a file including letters and symbols stored in the external storage medium and set by said setting part in its file name can be subjected to the direct print efficiently.

BRIEF DESCRIPTION OF THE DRAWINGS

Illustrative aspects in accordance with the invention will be described in detail with reference to the following figures wherein:

FIG. 8A is a diagram of a list of all files;

FIG. 8B is a diagram of an extraction pattern 1;

FIG. 8C is a diagram of an extraction pattern 2;

FIG. 8D is a diagram of an extraction pattern 3;

FIG. 8E is a diagram of an extraction pattern 4;

DETAILED DESCRIPTION OF THE PREFERRED ILLUSTRATIVE ASPECTS

An illustrative aspect of the present invention will be described with reference to FIGS. 1 to 10.

1. Overall Configuration of Printer

A printer 10 (an example of an "image forming apparatus") according to this illustrative aspect can include a PC print function to receive print file from, for example, a host computer (not shown) and to print the file, and a direct print function to directly read image file (herein also referred to as "a data") stored in an external memory (for example, a USB memory 17 in this illustrative aspect) and to print the file. The printer 10 has the following characteristic configuration particularly in the direct print function. The "image forming apparatus" is not limited to a printing apparatus such as a printer (for example, a laser printer), but can also be a facsimile device or a multifunction apparatus having a printer function and a read function (a scanner function) or the like.

Figure 1:
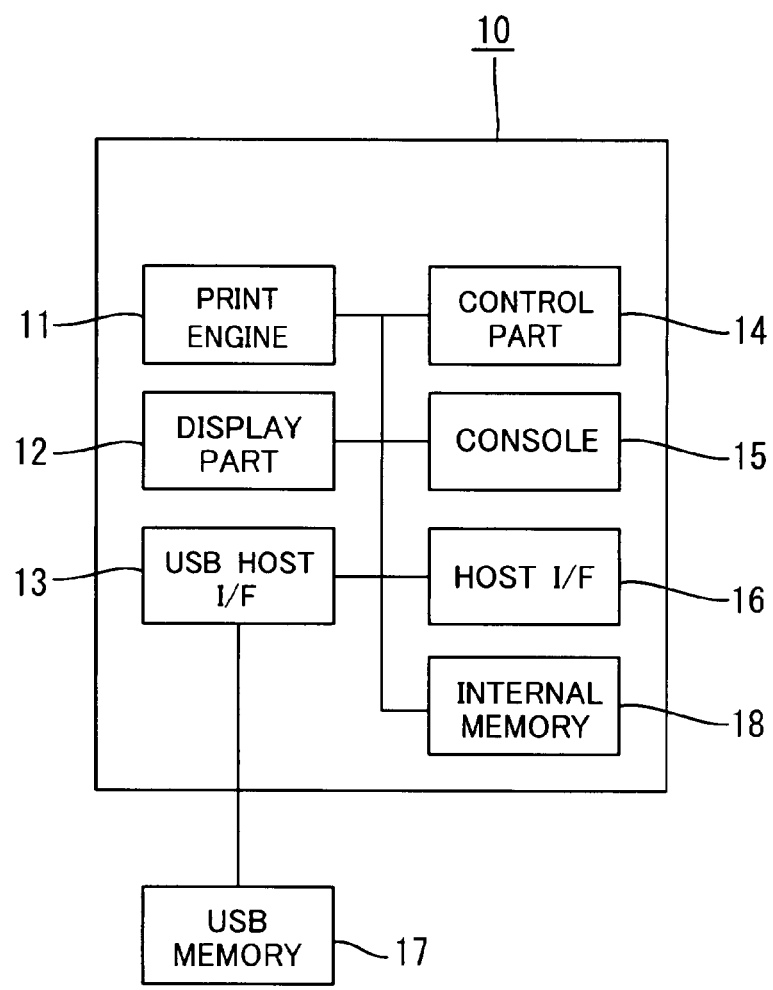
FIG. 1 is schematic illustration of hardware configuration of a printer according to an illustrative aspect of the present invention.

FIG. 1 is schematic illustration of hardware configuration of the printer 10. The printer 10 can include a print engine 11 for performing print operation on sheet P being a print medium, a display part 12, a USB host I/F 13, a control part 14, a console 15 for user operation, a host I/F 16 and an internal memory 18. A print processing region in the internal memory 18 can store a program to control operation of the entire printer 10, for example. The control part 14 can include a CPU that controls operation of the print engine 11 or the display part 12 based on the program stored in the internal memory 18. The printer 10 can also communicate data with the above host computer via the host I/F 16. The printer 10 can further include USB memory 17 that can be attached/detached. Information in the USB memory 17 is read via the USB host I/F 13.

2. Memory Structure in USB Memory 17

Figure 2:
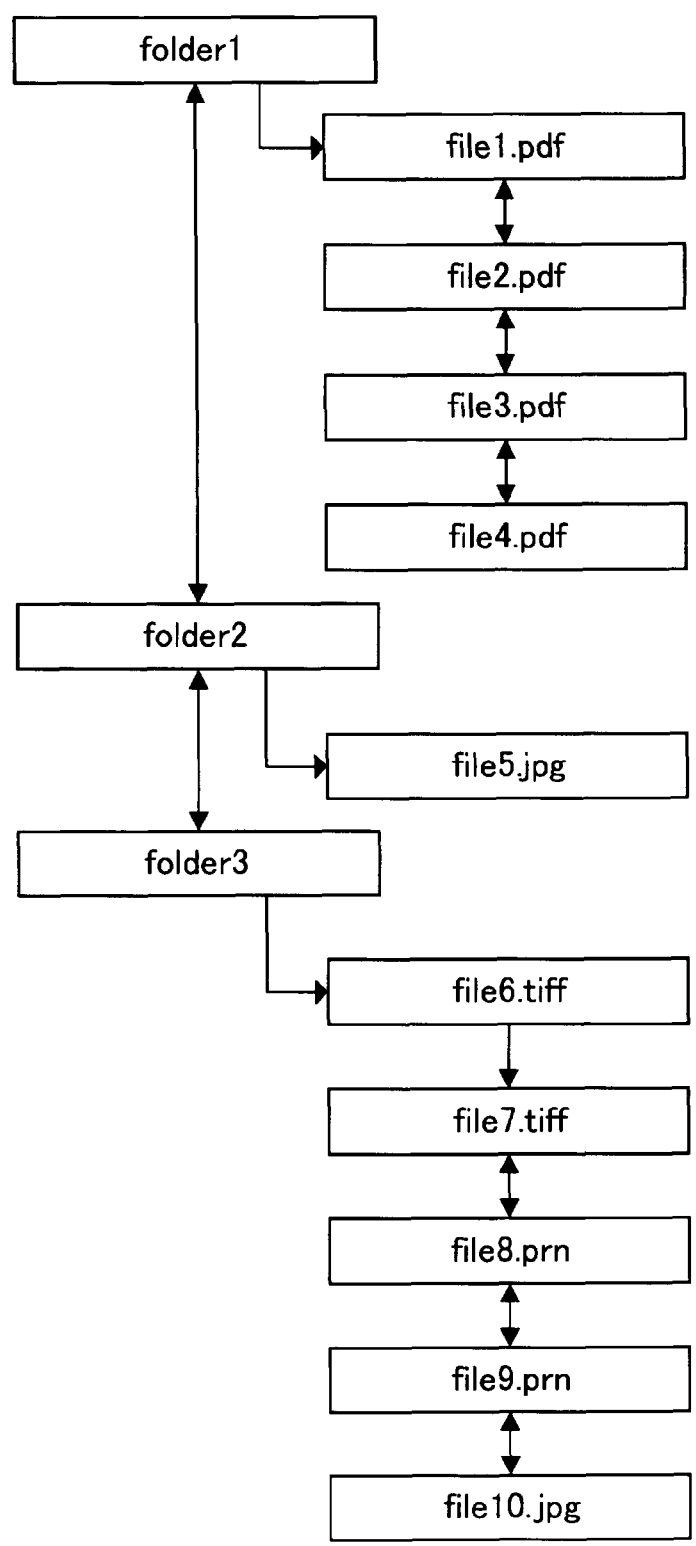
FIG. 2 is a diagram showing memory structure in a USB memory.

In the USB memory 17, a tree-structured file system is constructed in which a plurality of directories are in a hierarchical form. A plurality of files (such as image data or text data) are stored in different folders (directories) created under user-preferred classifications, for example. According to this illustrative aspect, as shown in FIG. 2, the USB memory 17 (an example of an "external storage medium") stores three folders (labeled "folder1", "folder2" and "folder3" in the drawing), for example. The folder 1 stores four PDF (Portable Document Format) files ("file1.pdf", "file2.pdf", "file3.pdf" and "file4.pdf"). The folder 2 stores a JPEG (Joint Photographic Experts Group) format file ("file5.jpg"). The folder 3 stores two TIFF (Tagged Image File Format) files ("file6.tiff" and "file7.tiff"), two printer file format files ("file8.prn" and "file9.prn") and a JPEG format file ("file10.jpg").

3. Configuration of Display Part and Console

Figure 3:
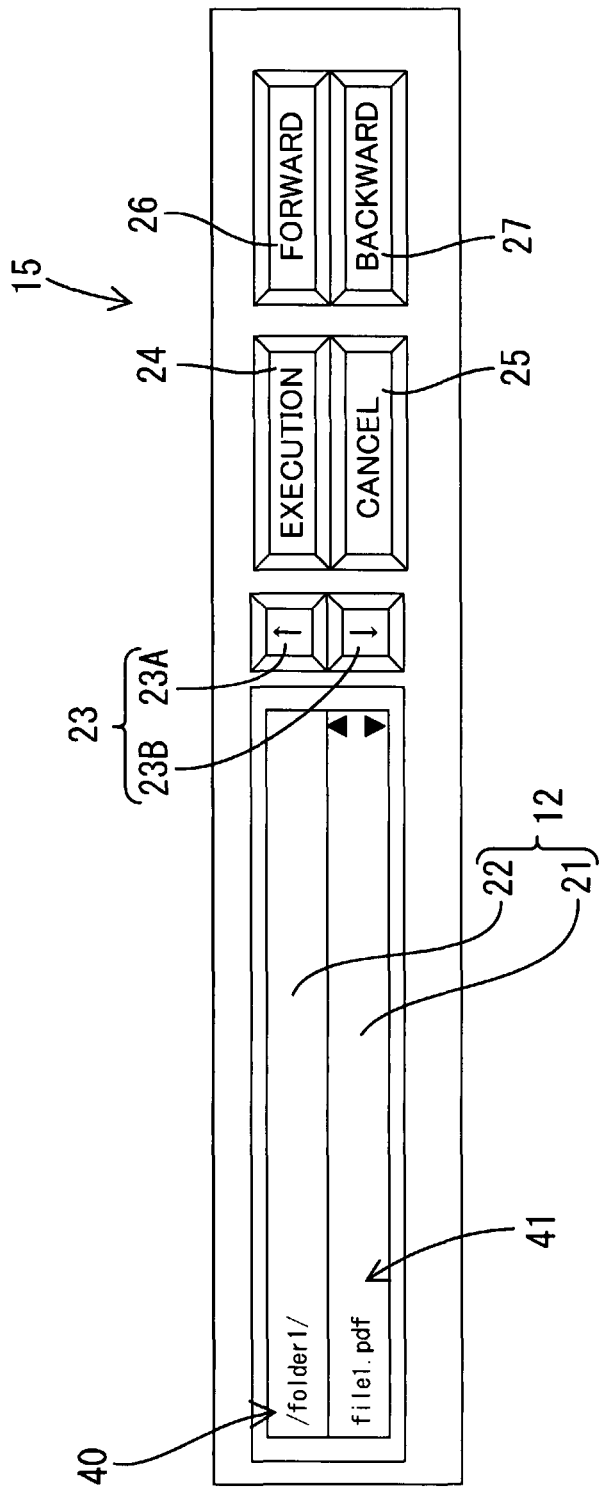
FIG. 3 is schematic depiction of a console and a display part arranged on the surface of a case of the printer.

FIG. 3 is schematic depiction of the console 15 and the display part 12 arranged on the surface of a case of the printer 10. The display part 12 is an LCD display part, for example, which has double-screen configuration in which a first display part 21 is arranged below a second display part 22. The second display part 22 displays a path name 40 indicating the position of a folder being a present display (processing) target in the above tree structure. The first display part 21 displays each file name 41 (an example of "first information specifying a file") in the folder one-by-one by scrolling. On the console 15, up/down switches 23 consisting of an up cursor key 23A and a down cursor key 23B, an execution key 24, a cancel key 25, a forward key 26 and a backward key 27 are arranged.

At execution of a direct print function, operation of the forward key 26 and the backward key 27, for example, causes movement from an upper layer to a lower layer and vice versa in the above tree structure. Pushing down the execution key 24 can cause designation of a file presently displayed on the first display part 21 ("file1.pdf" in FIG. 3) as a target of direct print. A plurality of files can be designated herein as target files of the direct print. When the designation of a target file of the direct print finishes, operation of the console 15 causes setting of various kinds of print conditions such as designation of the sheet size or the number of copies, for example.

4. Direct Print

The printer 10 according to this illustrative aspect can extract only non-printed files that satisfy a particular extraction condition from the USB memory 17 and perform the direct print of the files. In particular, the printer 10 has an "automatic direct print function" to set an extraction condition previously and to extract files automatically according to the above extraction conditions when the printer 10 is equipped with the USB memory 17, and a "manual direct print function" to set an extraction condition manually when a request for the direct print is received and to extract files according to the extraction condition being set.

(1) Automatic Direct Print Function (a) Setting of Extraction Condition

In order to execute the automatic direct print function, it is necessary to set an extraction condition previously (for example, before the USB memory 17 is equipped). The printer 10 is in a standby state shown in FIG. 4 after the power source is turned on, for example. In that state, the USB memory 17 is not equipped and manual direct print is not requested through pre-determined operation of the console 15. If setting of an extraction condition is requested through the pre-determined operation of the console 15 (S1, S2: N and S3: Y), the control part 14 executes, at S7, processing of setting an extraction condition for automatic direct print shown in FIG. 5. For example, as shown in FIG. 6, the part 14 displays a character string "Auto Direct Setting" on the second display part 22, and sequentially displays character strings "Auto=FileType", "Auto=FileName", "Auto=Date" and "Auto=OFF" one-by-one by scrolling on the first display part 21 depending on operation of the up/down switches 23. When the execution key 24 is pushed down, an extraction condition can be set based on an attribute corresponding to a presently displayed character string. In summary, operation of the console 15 can cause selection from "set extraction condition based on file format", "set extraction condition based on file name", "set extraction condition based on date" and "turn off automatic direct print".

Figure 5:
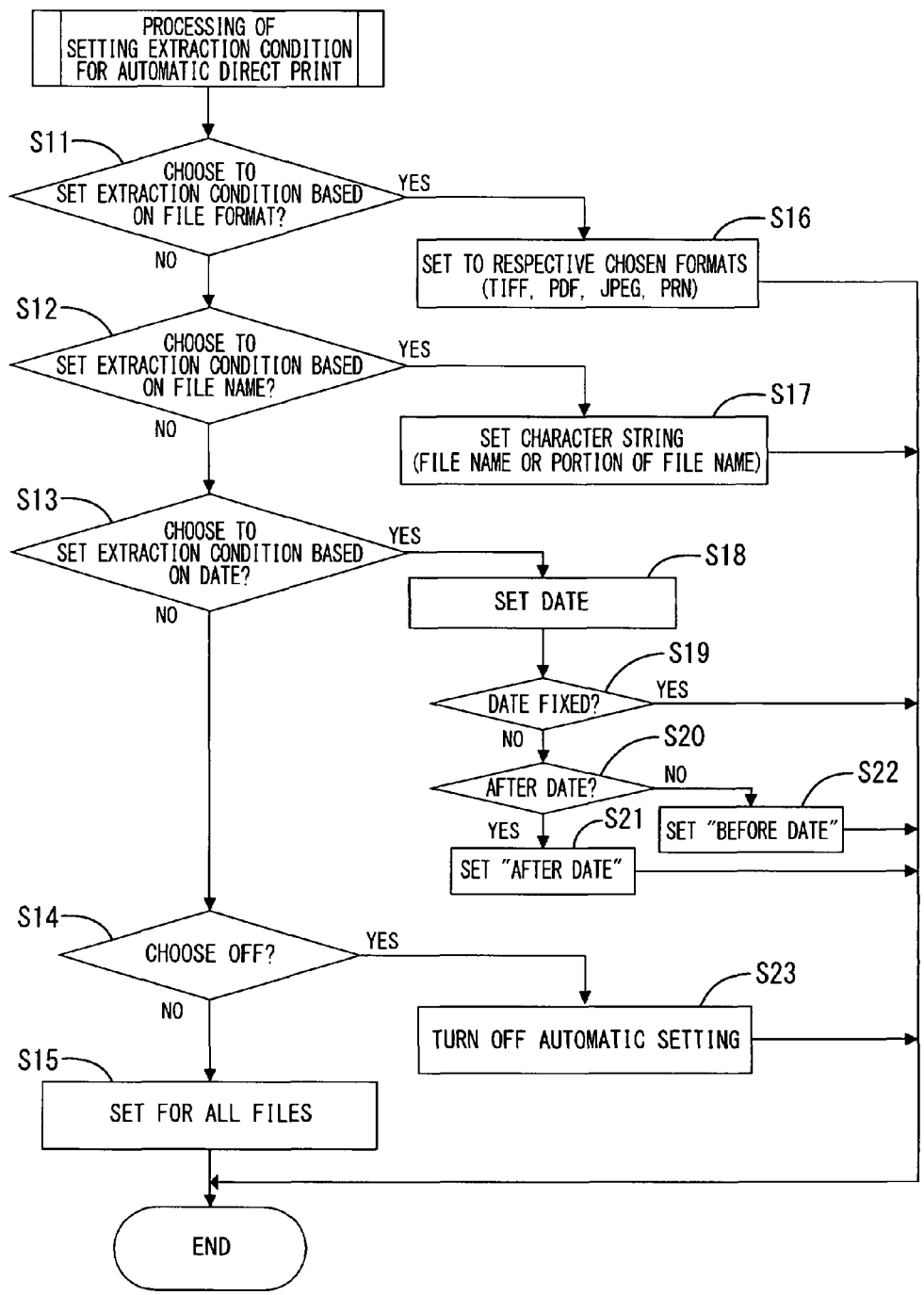
FIG. 5 is a flowchart showing processing of setting an extraction condition for automatic direct print.
Figure 6:
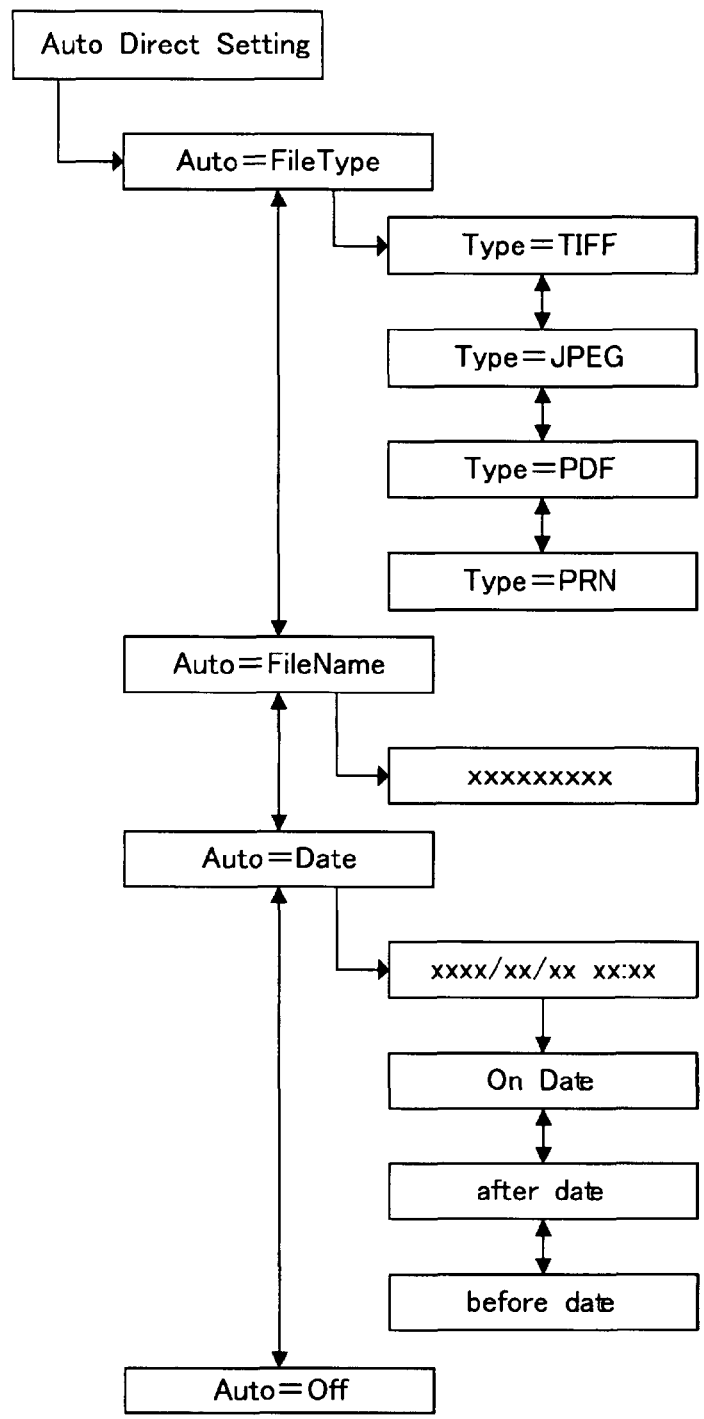
FIG. 6 is a diagram showing display patterns at setting an extraction condition.
Figure 7:
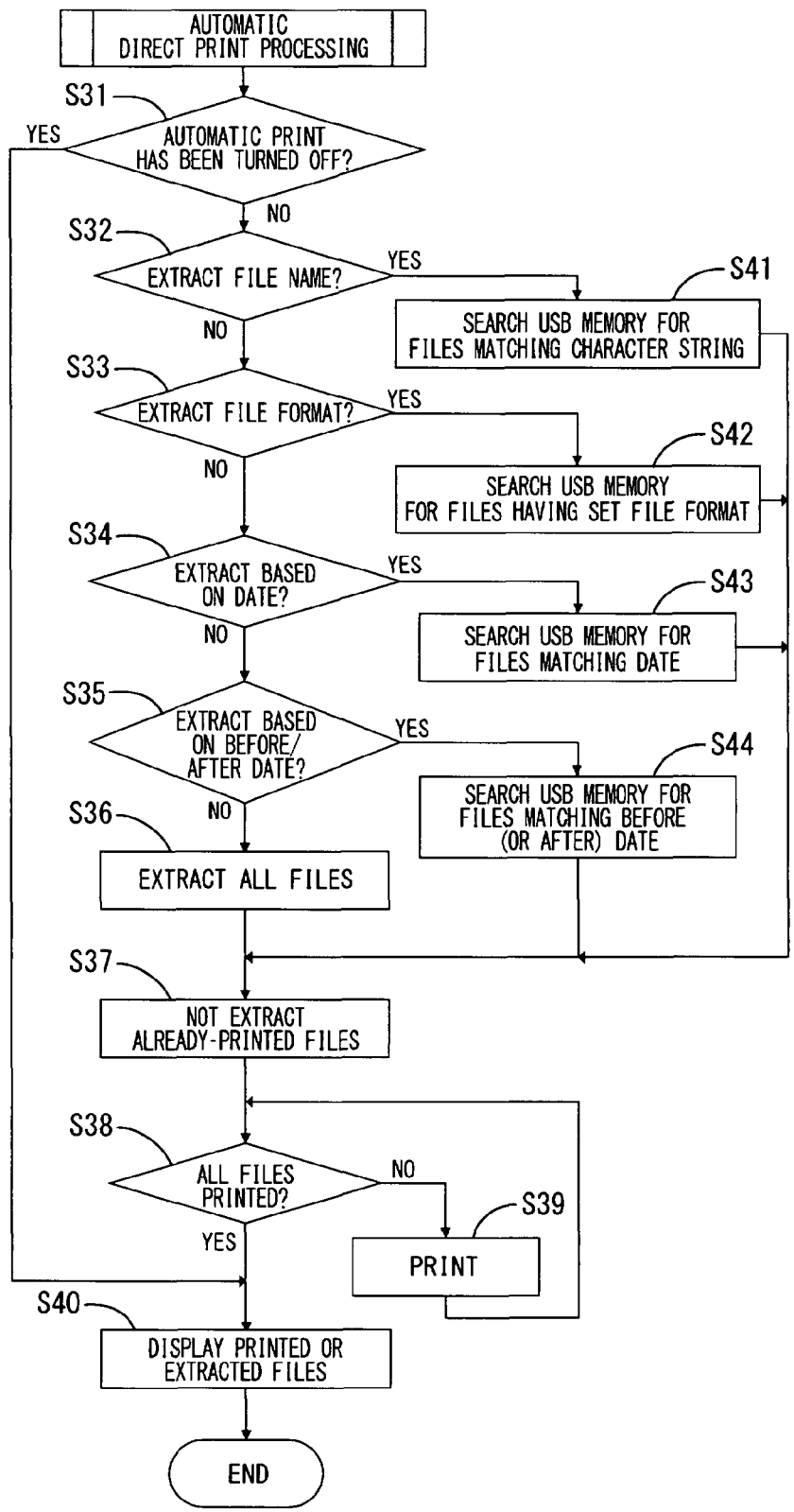
FIG. 7 is a flowchart showing automatic direct print processing.
Figure 9:
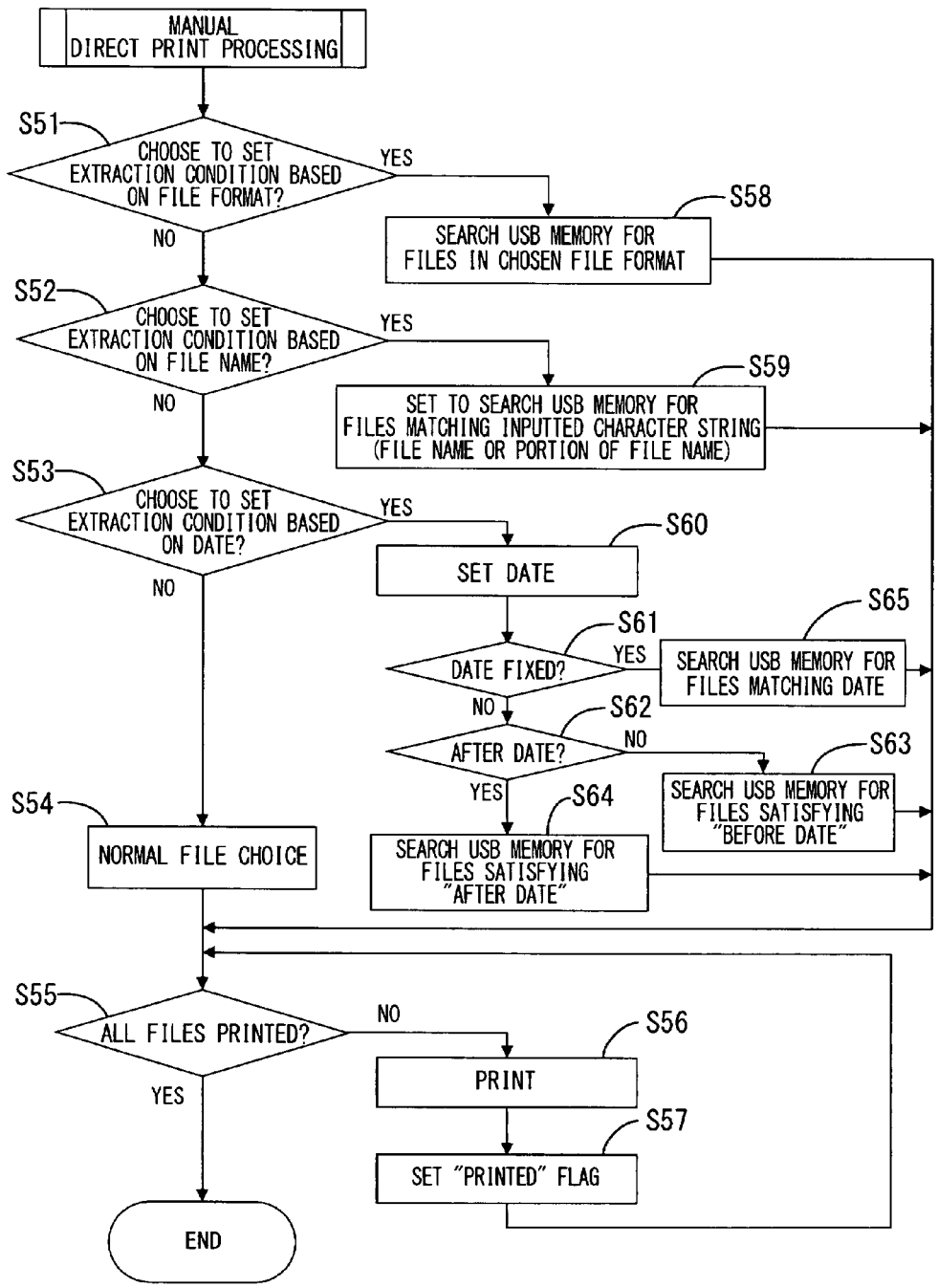
FIG. 9 is a flowchart showing manual direct print processing.

In FIG. 5, if "set extraction condition based on file format" is chosen (S11: Y), the first display part 21 displays character strings "Type=TIFF", "Type=JPEG", "Type=PDF" and "Type=PRN", for example, one-by-one by scrolling as shown in FIG. 6. If the execution key 24 is pushed down, a file format corresponding to a character string presently displayed on the first display part 21 is stored as an extraction condition in a pre-determined region in the internal memory 18 (S16). Multiple kinds of file formats can be set as an extraction condition using an AND condition or an OR condition.

If "set extraction condition based on file name" is chosen (S12: Y), the first display part 21 displays a character string "xxxxxxxxxxxx" (for example, a file name (without an extension) or a portion of it) inputted through pre-determined input operation of the console 15, for example, as shown in FIG. 6. If the execution key 24 is pushed down, a character string presently displayed on the first display part 21 is stored as an extraction condition in a pre-determined region in the internal memory 18 (S17).

If "set extraction condition based on date" is chosen (S13: Y), the first display part 21 displays a date "xxxx/xx/xx xx:xx" inputted through pre-determined input operation of the console 15, for example, as shown in FIG. 6. A date may or may not include time. If the execution key 24 is pushed down, a date presently displayed on the first display part 21 is stored as an extraction condition in a pre-determined region in the internal memory 18 (S18). Then, for example, as shown in the drawing, the first display part 21 displays character strings "On Date", "after date" and "before date" one-by-one by scrolling.

If the execution key 24 is pushed down in a state in which "on date" is displayed (S19: Y), "on date" being presently displayed is stored as an extraction condition in a pre-determined region in the internal memory 18. If the execution key 24 is pushed down (S19: N and S20: Y) in a state in which "after date" is displayed, "after date" being presently displayed is stored as an extraction condition in a pre-determined region in the internal memory 18 (S21). If the execution key 24 is pushed down in a state in which "before date" is displayed (S19: N and S20: N), "before date" being presently displayed is stored as an extraction condition in a pre-determined region in the internal memory 18 (S22).

If "turn off automatic direct print" is chosen (S14: Y), an automatic direct print function is set to an off state (S23). By this setting, as described later, the automatic direct print function to automatically extract a file in the USB memory 17 and to print the file is not executed even if the printer 10 is equipped with the USB memory 17. If any of "set extraction condition based on file format", "set extraction condition based on file name" and "set extraction condition based on date" is not chosen, i.e., if no extraction condition is set and automatic direct print is set to an on state (S11, S12, S13: N and S14: N), then "no extraction condition" is set (all non-printed files are set as extraction targets) (S15). In that case, the console 15 functions as a "setting part".

(b) Execution of Automatic Direct Print

Figure 4:
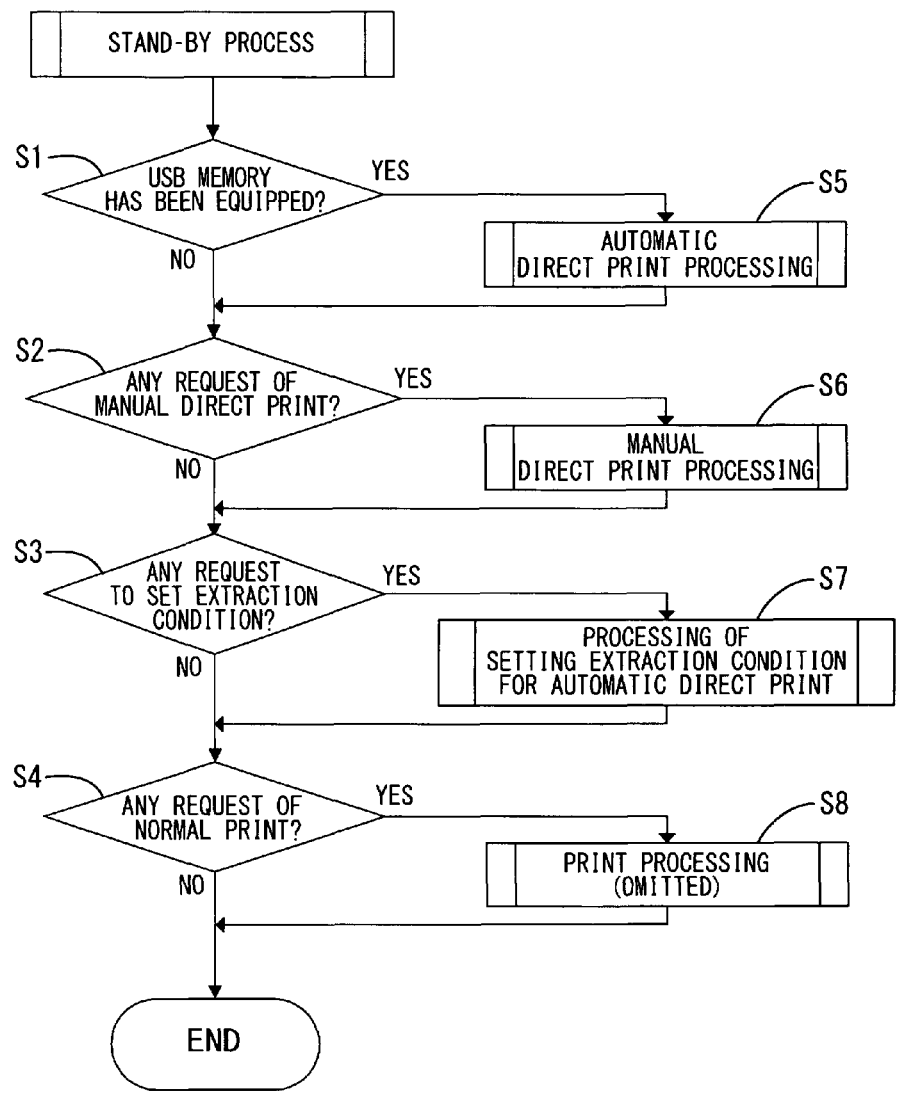
FIG. 4 is a flowchart showing a stand-by process.

If the printer 10 is equipped with the USB memory 17 in a state in which an extraction condition is set as in FIG. 4 (S1: Y in FIG. 4), the control part 14 executes, at S5, automatic direct print processing shown in FIG. 7. At S31, on/off setting of an automatic direct print function to perform the setting at S14 in FIG. 5 is confirmed. If the automatic direct print function is set to an on state (S31: N), the automatic direct print function is executed.

In particular, if "extraction conditions based on file name" is set (S32: Y), the above character string "xxxxxxxxxxxx" set at S17 in FIG. 5 is used as a file name (a string included as a portion of the file name can be also regarded as satisfying the extraction condition), and only files that have never been printed (non-printed files) are extracted from the USB memory 17 (S41 and S37). According to this illustrative aspect, for a file that has ever been printed, for example a "Printed" flag (an example of "second information of being printed") being associated with the file is stored in the USB memory 17. Therefore, it can be judged whether or not a file is a non-printed file based on whether or not the "Printed" flag is set. If "extraction condition based on file format" is set (S33: Y), only non-printed files in a file format set at S16 in FIG. 5 are extracted from the USB memory 17 (S42 and S37).

If a particular date is set as an extraction condition for "set extraction condition based on date" (S34: Y), only non-printed files whose creation date matching the above date "xxxx/xx/xx" set at S18 in FIG. 5 are extracted from the USB memory 17 (S43 and S37). If "Before" or "After" the above particular date is set as an extraction condition (S35: Y), only non-printed files having a creation date before or after the above date "xxxx/xx/xx" set at S18 in FIG. 5 are extracted from the USB memory 17 (S44 and S37). In the above processing, the control part 14 functions as an "extracting part" and a "judging part".

If "All Files" are set as an extraction condition (S15 in FIG. 5), all non-printed files are extracted from the USB memory 17 (S36 and S37).

Afterward, the control part 14 performs data expansion processing on the non-printed files (in particular, expansion processing on bit map data) extracted under the respective extraction conditions, and sequentially passes the expanded data to the print engine 11. According to this, the print engine 11 executes print operation to form an image depending on the expanded data on the sheet P (S38: N and S39). In this way, the control part 14 and the print engine 11 function as "printing parts". When data expansion processing finishes on the extracted files (S38: Y), the display part 12 displays file names of the extracted files by scrolling (S40).

If no file satisfying an extraction condition being set is stored in the USB memory 17, the second display part 22 can display a message such as "no file to be printed".

FIG. 8A particularly shows a list of all files (an example of "associated information") managed by a file system of the USB memory 17. For each file, a file name (including its extension), a creation date and existence of a "Printed" flag are managed in that order from the left. In the list, only "yamada00001.JPG" and "FILE00003.JPG" have been already printed and "Printed" flags are set to "1" for the files. Accordingly, the files will not be extracted in the following extraction pattern (see S37 in FIG. 7).

Figure 8B:
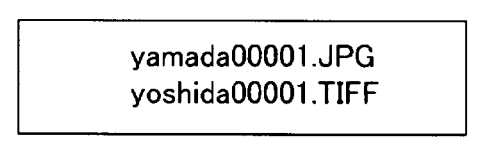
Figure 8C:
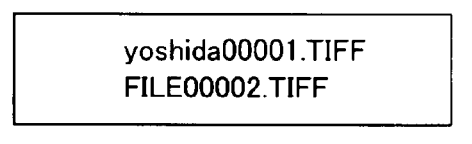
Figure 8D:
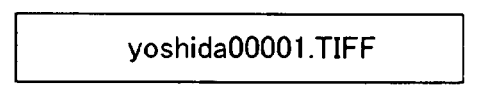

If "yamada" and "yoshida", for example, are set as an extraction condition for "set extraction condition based on file name" (S17 in FIG. 5), "yamada00001.JPG" and "yoshida00001.TIFF" are extracted as print targets, as shown in an extraction pattern 1 in FIG. 8B and the direct print is executed for the files. If a TIFF file is set as an extraction condition for "extraction condition based on file format" (S16 in FIG. 5), as shown in an extraction pattern 2 in FIG. 8C, "yoshida00001.TIFF" and "FILE00002.TIFF" are extracted as print targets and the direct print is executed for the files. If "2006/07/19 16:48" is set as an extraction condition for "set extraction condition based on date" (S19: Y in FIG. 5), "yoshida00001.TIFF" is extracted as a print target and the direct print is executed for the file, as shown in an extraction pattern 3 in FIG. 8D. If "before 2006/07/19" is set as an extraction condition (S20: Y in FIG. 5), "yamada00001.JPG", "FILE00003.JPG" and "FILE00005.JPG" are extracted as print targets and the direct print is executed for the files, as shown in an extraction pattern 4 in FIG. 8E.

(2) Manual Direct Print Function

Figure 10:
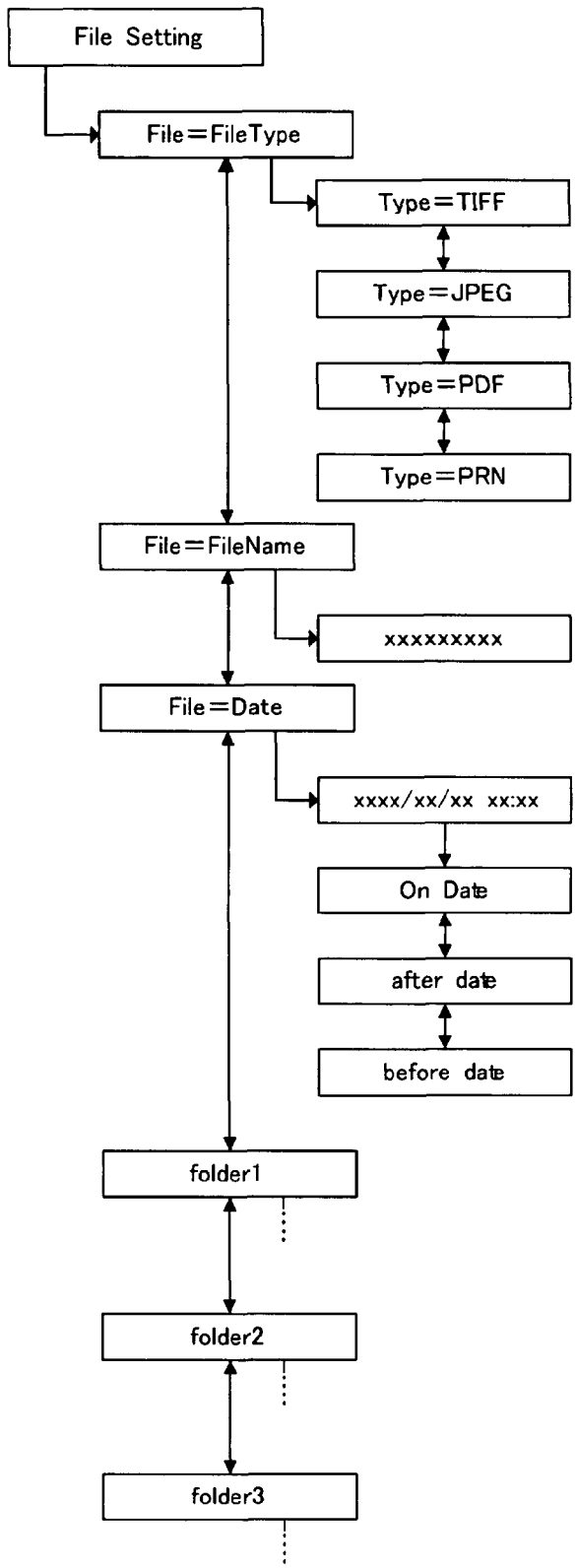
FIG. 10 is a diagram showing display patterns at the manual direct print.

For example, when the direct print is requested through pre-determined operation of the console 15 in a state that the printer 10 has been already equipped with the USB memory 17 (S2: Y in FIG. 4), the control part 14 executes, at S6, manual direct print processing shown in FIG. 9. For example, as shown in FIG. 10, the control part 14 causes the second display part 22 to display a character string "File Setting" and the first display part 21 to sequentially display character strings "File=FileType", "File=FileName", "File=Date", "folder1", "folder2" and "folder3" depending on operation of the up/down switches 23 one-by-one by scrolling. When the execution key 24 is pushed down, an extraction condition can be set based on an attribute corresponding to a presently displayed character string. In summary, operation of the console 15 can serve to select any of "set extraction condition based on file format", "set extraction condition based on file name", "set extraction condition based on date" or "normal file choice ("folder1", "folder2" or "folder3")". If the manual direct print function is used, files are extracted under an extraction condition irrespective of being a non-printed file or not.

If "set extraction condition based on file format" is chosen (S51: Y), the first display part 21 displays character strings "Type=TIFF", "Type=JPEG", "Type=PDF" and "Type=PRN", for example, one-by-one by scrolling, as shown in FIG. 10. If the execution key 24 is pushed down, files in a file format corresponding to a character string presently displayed on the first display part 21 are extracted from the USB memory 17 (S58).

If "set extraction condition based on file name" is chosen (S52: Y), the first display part 21 displays, for example, a character string "xxxxxxxxxxxx" (for example, a file name (not including an extension) or a portion of it) inputted through pre-determined input operation of the console 15, as shown in FIG. 10. If the execution key 24 is pushed down, a file having a file name matching a character string presently displayed on the first display part 21 or including the string as a portion of the name is extracted from the USB memory 17 (S59).

If "set extraction condition based on date" is chosen (S53: Y), the first display part 21 displays, for example, a date "xxxx/xx/xx xx:xx" inputted through pre-determined input operation of the console 15, as shown in FIG. 10. The date may or may not include time. If the execution key 24 is pushed down, a date presently displayed on the first display part 21 is stored as an extraction condition in a pre-determined region in the internal memory 18 (S60). Then, for example as shown in the drawing, the first display part 21 displays character strings "On Date", "after date" and "before date" one-by-one by scrolling. If the execution key 24 is pushed down in a state in which "On Date" is displayed (S61: Y), a file having a creation date as "date" being presently displayed is extracted from the USB memory 17 (S65). If the execution key 24 is pushed down in a state in which "after date" is displayed (S61: N and S62: Y), a file having a creation date as "after date" being presently displayed is extracted from the USB memory 17 (S64). If the execution key 24 is pushed down in a state in which "before date" is displayed (S61: N and S62: N), a file having a creation date as "before date" being presently displayed is extracted from the USB memory 17 (S63).

If no file satisfying extraction conditions being set is stored in the USB memory 17, the second display part 22 can display a message such as "no file to be printed".

If the execution key 24 is pushed down in a state that the first display part 21 displays any of "folder1", "folder2" and "folder3", then the processing proceeds as "normal file choice" (S54), in which desired files can be individually designated for choice from the USB memory 17 through operation of the console 15.

Then, the control part 14 performs data expansion processing on files (specifically, expansion processing on bit map data) extracted under respective extraction conditions or designated for choice, and sequentially passes the expanded data to the print engine 11. According to this, the print engine 11 executes print operation to form an image depending on the expanded data on the sheet P (S55: N and S56). During the operation, a "Printed" flag is set for the files subjected to the direct print (S57). During the operation, the control part 14 functions as a "generation part".

If a pre-determined print request is made, for example, print data is received from a computer connected to be able to communicate with the printer 10 during the stand-by processing in FIG. 4 (S4: Y), then normal print processing (for example, PC print) is executed (S8).

5. Effects of this Illustrative Aspect (1) According to this illustrative aspect, only non-printed files among files stored in the USB memory 17 can be subjected to the direct print. If an extraction condition is previously set and the automatic direct print function is turned on, non-printed files satisfying the above extraction condition can be automatically extracted based on the fact that the printer 10 is equipped with the USB memory 17.

(2) Also according to the aspect, association information of existence of a "Printed" flag to determine whether or not a file is a non-printed file is managed by the USB memory 17. This can reduce the capacity of a built-in memory of the printer 10.

(3) Files can be extracted under various extraction conditions such as a file format, a file name or a creation date. For example, only files can be extracted that include a particular character string. Moreover, file names of extracted files are displayed on the display part 12, making the extraction result easily confirmed.

<Other Illustrative Aspects>

The present invention is not limited to the illustrative aspect described in relation to the above description and the drawings. However, the following illustrative aspects, for example, are also encompassed within the technical range of the present invention.

(1) The above illustrative aspect has been described by giving an example of the USB memory 17 as a storage medium. However, the present invention is not limited to this. For example, a memory card such as a compact flash (R), smart media (R) or a memory stick (TM) can also be used.

(2) According to the above illustrative aspect, only one of "set extraction condition based on file format", "set extraction condition based on file name" and "set extraction condition based on date" can be performed selectively. However, the present invention is not limited to this. For example, an extraction condition can also be set in combination (an AND condition and an OR condition are both possible) of two or more of the settings.

(3) According to the above illustrative aspect, a "Printed" flag is stored in the USB memory 17 in association with a printed file. However, information of association between a "Printed" flag and a printed file can be stored in the internal memory 18 of the printer 10. However, as in the above illustrative aspect, it may be more desirable that information of whether or not a file in the USB memory 17 has been printed is managed by storing it in the USB memory 17.

(4) According to the above illustrative aspect, non-printed files are print targets at the automatic direct print. However, any file can be extracted under an extraction condition irrespective of whether or not the file is a non-printed file. Alternatively, non-printed files can also be print targets at the manual direct print.

What is claimed is:

1. An image forming apparatus comprising:
    an external storage medium receptacle configured to receive an external storage medium including files containing image data;
    an input device configured to accept an extraction condition setting request and extraction condition data from a user;
    a printing mechanism; and
    a controller configured to:
        determine whether an external storage medium including files containing image data is received by the external storage medium receptacle;
        determine whether a request of manual print is accepted by the input device in response to determining that the external storage medium is received by the external storage medium receptacle;
        enter a manual mode to set an extraction condition to extract files from the external storage medium in response to determining that the request of manual print is accepted;
        enter an automatic mode to extract files from the external storage medium based on a preset extraction condition in response to determining that the request of manual print is not accepted;
        determine whether the extraction condition setting request is accepted by the input device in response to determining that the external storage medium is not received by the external storage medium receptacle and the request of manual print is not accepted;
        receive an extraction condition from the input device in response to determining that the extraction condition setting request is accepted;
        store the extraction condition in a memory;
        determine whether an external storage medium including files containing image data is received by the external storage medium receptacle in response to storing the extraction condition in the memory;
        determine whether the files that satisfy the extraction condition stored in the memory exist in the external storage medium in response to determining that the external storage medium is received by the external storage medium receptacle;
        extract the files that satisfy the extraction condition stored in the memory from the external storage medium in response to determining that the files that satisfy the extraction condition stored in the memory exist in the external storage medium; and
        control the printing mechanism to print an image based on image data in at least one of the extracted files.

2. The image forming apparatus according to claim 1, wherein the extraction condition includes at least one of a file format and a file creation date.

3. The image forming apparatus according to claim 1, wherein the extraction condition includes at least one of an on date, a before date, or an after date, wherein the on date is a date inputted through the input device, the before date is a date before the inputted date, and the after date is a date after the inputted date.

4. The image forming apparatus according to claim 3, further comprising an internal storage medium configured to store the at least one of the on date, before date, or the after date accepted by the input device.

5. The image forming apparatus according to claim 1, further comprising a display device configured to display information specifying the extracted file.

6. The image forming apparatus according to claim 5, wherein the controller is further configured to control the display device to display a message that, if no file satisfies the extraction condition stored in memory, no files exist among the files in the external storage medium satisfying the extraction condition.

7. The image forming apparatus according to claim 1, further comprising an internal storage medium configured to store the extraction condition data accepted by the input device.

8. The image forming apparatus according to claim 1, further comprising a scanner mechanism.

9. The image forming apparatus according to claim 1, further comprising a facsimile mechanism.

10. The image forming apparatus according to claim 1, further comprising a scanner mechanism and a facsimile mechanism.

11. The image forming apparatus according to claim 1, wherein the controller is further configured to:
   determine if a file that satisfies the extraction condition stored in memory has been previously printed by checking a print status indicator;
   control the printing mechanism to print the image associated with the file only if the file has not been previously printed; and
   set, if the image is printed, a print status indicator for the file, indicating that the file associated with the image has been printed.

12. A printer including a printing mechanism configured to print an image, the printer comprising:
   an external storage medium receptacle configured to receive an external storage medium including files containing image data;
   an input device configured to accept an extraction condition setting request and extraction condition data from a user; and
   a controller configured to:
      determine whether an external storage medium including files containing data is received by the external storage medium receptacle;
      determine whether a request of manual print is accepted by the input device in response to determining that the external storage medium is received by the external storage medium receptacle;
      enter a manual mode to set an extraction condition to extract files from the external storage medium in response to determining that the request of manual print is accepted;
      enter an automatic mode to extract files from the external storage medium based on a preset extraction condition in response to determining that the request of manual print is not accepted;
      determine whether the extraction condition setting request is accepted by the input device in response to determining that the external storage medium is not received by the external storage medium receptacle and the request of manual print is not accepted;
      receive an extraction condition from the input device in response to determining that the extraction condition setting request is accepted;
      store the extraction condition in a memory;
      determine whether an external storage medium including files containing image data is received by the external storage medium receptacle in response to storing the extraction condition in the memory;
      determine whether the files that satisfy the extraction condition stored in the memory exist in the external storage medium in response to determining that the external storage medium is received by the external storage medium receptacle;
      extract the files that satisfy the extraction condition stored in the memory from the external storage medium in response to determining that the files that satisfy the extraction condition stored in the memory exist in the external storage medium; and
      control the printing mechanism to print an image based on the image data at least one of in the extracted files.

13. The printer according to claim 12, wherein the extraction condition includes at least one of a file format and a file creation date.

14. The printer according to claim 12, wherein the extraction condition includes at least one of an on date, a before date, or an after date, wherein the on date is a date inputted through the input device, the before date is a date before the inputted date, and the after date is a date after the inputted date.

15. The printer according to claim 14, further comprising an internal storage medium configured to store the at least one of the on date, before date, or the after date accepted by the input device.

16. The printer according to claim 12, further comprising a display device configured to display information specifying the extracted file.

17. The printer according to claim 16, wherein the controller is further configured to control the display device to display a message that, if no file satisfies the extraction condition stored in memory, no files exist among the files in the external storage medium satisfying the extraction condition.

18. The printer according to claim 12, further comprising an internal storage medium configured to store the extraction condition data accepted by the input device.

19. The printer according to claim 12, wherein the controller is further configured to:
   determine if a file that satisfies the extraction condition stored in memory has been previously printed by checking a print status indicator;
   control the printing mechanism to print the image associated with the file only if the file has not been previously printed; and
   set, if the image is printed, a print status indicator for the file, indicating that the file associated with the image has been printed.

* * * * *